W. R. ACTON.
Tailors' Measure.
No. 4,742.
Patented Sept. 5, 1846.
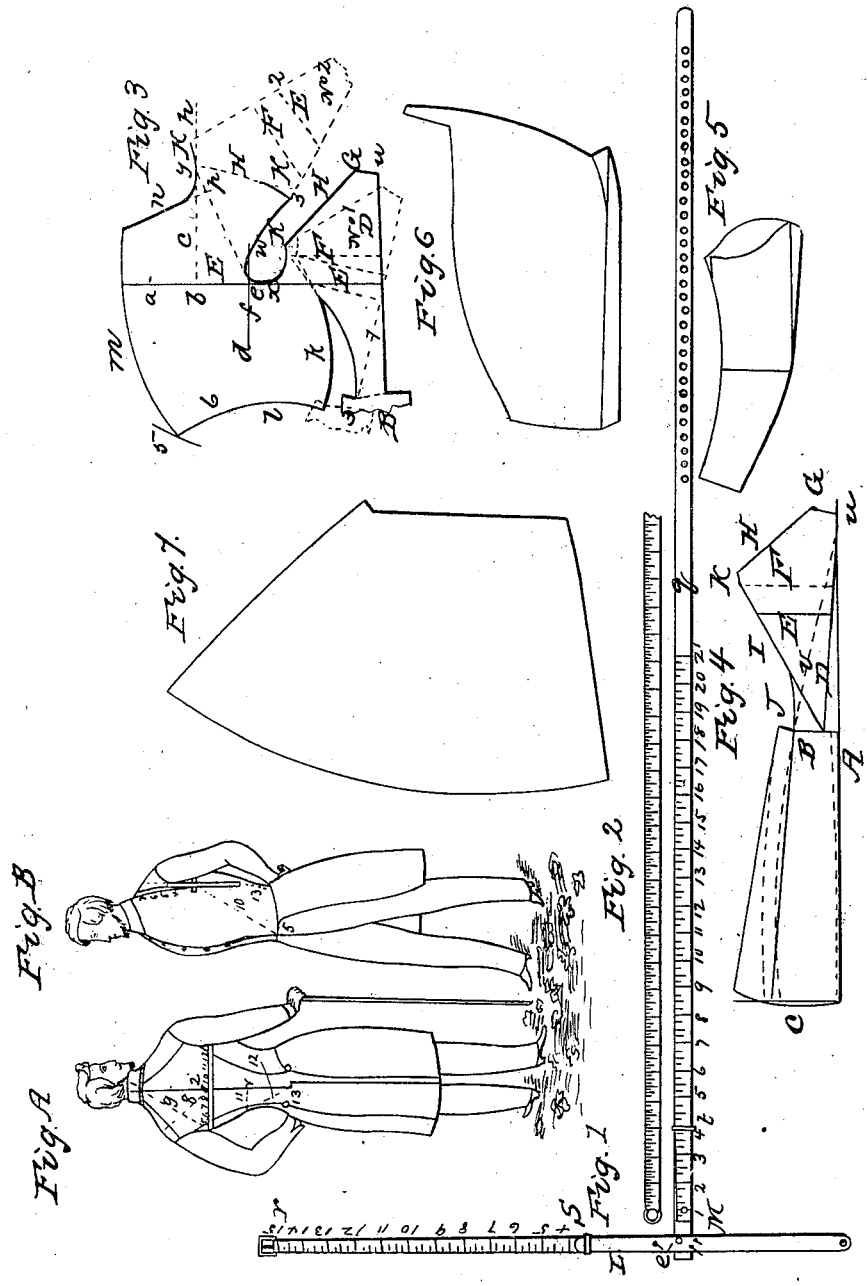

UNITED STATES PATENT OFFICE.

WM. R. ACTON, OF RICHMOND, VIRGINIA.

TAILOR'S MEASURE.

Specification of Letters Patent No. 4,742, dated September 3, 1846.

*To all whom it may concern:*

Be it known that I, WILLIAM R. ACTON, of Richmond, in the county of Henrico and State of Virginia, have invented a new and useful instrument for aiding and assisting in taking the requisite and proper measures of the human form for the proper formation of gentlemen's coats or ladies' habits; and I do hereby declare the following to be a full and exact description of the construction and operation of the same, reference being had to the accompanying drawings, making a part of this specification.

Figure 1, is a view of my improved measuring instrument. Fig. 2, is a plan of an ordinary tape measure which I use in conjunction with my measuring instrument. Figs. 3, and 4, are diagrams showing the manner of applying the measures taken with my improved measuring instrument for forming the body of a coat. Figs. 4, 5, and 6, are plans of the skirts of a dress and frock coat, and the sleeve of a coat.

My measuring instrument is composed of two narrow flexible metallic plates of metal—L, and M. The plate L, is about ten inches in length, the plate M, is four and a half inches in length—one end of the plate M, is united to the plate L, at right angles with the same, at the distance of about one third of its length from one of the ends of plate L. At the junction of the plate L, with the plate M, at the angle nearest to the shortest end of plate L, there is a knob $e$, and at the distance of six inches below the same on the longest end of plate L, there is a similar knob $d$. To the shortest or upper end of the plate L, there is secured by a knob, and slide $s$, a leather strap $r$, fifteen inches in length from knob $e$, laid off in inches and quarters and numbered as shown in drawings,—with a buckle at the end of the same. To the plate M, there is secured a leather strap $q$, forty five inches in length, laid off in inches and quarters, and numbered for the distance of twenty one inches from the knob $e$, the strap $q$, fits into the buckle on the end of strap $r$, and there are holes in the same for about one third of its length for the tongue of the buckle to fit into. The measuring instrument is fitted to the person as shown in Figs. A, and B, of the accompanying drawings; the plate M, is placed under the left arm, and the upper part of plate L, is pressed against the front of the same in a vertical position; the strap $r$, is then carried over the left shoulder, and the strap $q$, is carried across the back, under the right arm, and up over the right shoulder, where it is secured in the buckle on the end of strap $r$.

If the person measured wishes to have his garment fit closely, the straps $q$ and $r$, are united so as to draw tightly over the shoulders; the person can judge by the fitting of the measuring instrument, exactly how loosely or closely the garment will fit to him, which is formed from measures taken with the same. Fig. 2, is a tape measure laid off in inches and quarters, and numbered, having a ring at one end; this ring is placed on the knobs $e$, and $d$, and from these points I take the various measures hereinafter set forth. The strap $r$, registers (by the scale laid off on the same) the distance from the knob $e$, to the socket bone of the neck; the strap $q$, also self registers the distance from the same point to the center of the back—and the distance between the two is the vertical distance between the socket bone and a line drawn from one arm pit to the other.

The following are the directions for taking the various measures required in laying off and forming a coat, to wit: With a common tape measure take the measure around the breast, which is the 1st measure—then measure around the waist for 2nd measure—then apply the instrument as shown in Figs. A, B, and ascertain the distance from 1 to 2 the socket bone indicated by scale on strap $r$, to the center of the back as indicated by scale on strap $q$, for the 3rd measure—then measure from 1 to 3, from the socket bone to the depth of the back for the 4th measure; then measure from 1 to 4 for the length of the skirt for the 5th measure—Find the number on strap $r$, at 1, indicating the distance of the socket bone from the knob $e$, for the 6th measure; find the center of back on strap $q$, showing the distance of the same from the knob $e$, for the 7th measure—Next secure the ring on the tape measure (Fig. 2,) to knob $e$, and pass the measure over the shoulder and down to the center of back on strap $q$, and ascertain the distance for the 8th measure—from the same pivot pass the measure under the left arm and up to the socket bone for the 9th measure; then from the same pivot pass the measure around in front to 5, for the length of the waist in front, for the 10th measure—Ascertain the central point on the back seam between 2 and 3, indicated by 7, in Fig. A: Now place the ring on tape measure (Fig. 2,) or the lower knob d, and ascertain the distance from this point to point 7, on back seam for the 11th measure: Take the distance from this knob to 3, the bottom of back seam for the 12th measure; take the distance from the lower knob to 6, the hip bone for the 13th measure: These are all the measures taken with the instrument. The 14th measure is the distance between the center of the back and the shoulder joint; the 15th measure is a continuation of this measure to the elbow—16th measure, to the wrist—17th measure is the scye or circumference of the arm at its junction with the body. 18th measure, is the circumference of the elbow 19th do—is the do—of the wrist—

The foregoing measures are applied in the formation of a coat as follows—in the accompanying drawings Fig. 4, represents the back of a dress or frock coat laid off in accordance with the same. Line A, is the edge of the cloth, mark on this a dot at u, for a starting point, from this point measure off the 4th and 5th measures for the length of the waist and length of the skirt, and project from those points the lines B, and C, at right angles with the same. Go in on B, two inches and make a dot, and thence draw line D, to starting point u, for the back seam. From u, measure down on line D, the 3rd measure, make a dot, and project from this point the line E, at right angles with the same—: from the junction of E, with D, go up on D, one sixth the 17th or scye measure, make a dot, and project the line F, parallel with line E. Go from terminus of line D, on line B, one sixth of scye measure, make a dot, from this point draw a line v, to u, on line A; project line G, at right angles with line v, from u, for the top of back. Go out on line F, the 14th measure and make a dot, and from thence to terminus of line D, on line B, draw line I. Go out on line G, one sixth of scye measure, and thence draw line H, to curve K, forming a part of eye. From the junction of the line v, with B draw the curve J, until it forms a smooth junction with line I—and the back is laid off, save the skirt, which is formed in the usual manner.

Fig. 3, represents the forepart of a dress or frock coat with the backs Nos. 1 and 2 appended. The backs having been cut out agreeably to the lines laid off, lay No. 1 upon the cloth in a proper position to cut the cloth to best advantage, and extend line E, from the back, as a regulating line for forming the forepart, and fitting it to the back. With the back secured to the cloth and the line E, extended on to the same apply the 7th measure on line E, from its junction with line D, and make a dot e; through this point draw the line f, at right angles with the line E: Six inches below dot e on line f, make dot d. The dots e, and d, on line f, occupy the same relative position on the cloth that knobs e, and d, do on the measuring instrument when placed on the body. Extend the line F, from the back on to the cloth one sixth of the 17th or scye measure and make dot w, for the center of the scye: From this point sweep the curve x, from the curve K, on the back till it forms a smooth junction with line E, for the lower part of scye. Extend out line E, from the center of the back, on to the forepart, the distance of one half the circumference of the breast measure, and make a dot a; ascertain the central point between a, and e, on line E, and mark dot b, at that point: From point b, project line c, at right angles with line E; place your tape measure at point e, on line E, and from this point ascertain the distance of the 6th measure to the upper portion of line c, which will be found at dot h; from point h, measure down line c, one sixth of scye measure, or the amount of line G, on back, and mark dot y, which will be the front point of shoulder—from this point draw line g, to point e, on line E; place one end of the tape measure at c, e, and measure on line g, the same distance that point a, is from point e, and mark point p, on line g; from point p, on line g, project line n, at right angles with the same for the height of the neck. Now place the top of back No. 2—the corner at the junction of lines G, and H, at the front shoulder point y, and form the curve of the neck forming a smooth junction with line n, the back No. 2 should be placed in such a position that the 8th measure will extend from point c, to 2, the center of back. With back No. 2, placed in this position, and back No. 1, placed as before described, I lay off the scye as follows:—Take the tape measure and apply it to the upper end of curve K, on back No. 1, carry it down curve x, and around a little beyond line f, and up in the direction of the lower part of curve K, on back No. 2 until you have proceeded to the extent of the scye measure at 3, which will not quite reach to curve k, on back No. 2; next form line i from front shoulder point y, to point z, to correspond in length with line H, on the back with which it is united forming the shoulder seam. Next proceed to lay off curve k, at the back of forepart for the side seam as follows: First find the central point between the line E, and line B, and make a dot 7; then place one end of the tape measure on the lower point d, and draw in the lower part of back until the 11th measure will extend to the point 7; and make dots by edge of back for the guides in forming a portion of curve k, then apply the 12th measure from point *d*, to 3, and form the lower part of curve *k*, by curve J, on the back—that part of curve *k*, above line E, is formed while the back is in the position represented by back No. 7, by the edge of the same. Next apply the 13th measure vertically from *d*, to 6,—the hip joint, then apply the 10th measure from *e*, to 5, in conjunction with the 2nd measure from 3, to 5, for the length of the waist in front. From point 5, draw up curve *m*, for turn of lapel to suit prevailing fashion—from the same point 5, draw curve *l*, through point 6, to bottom of side seam.

What I claim as my invention and desire to secure by Letters Patent, is—

1. The constructing a tailors measuring instrument by the combination of the elastic metallic plates L, and M, self registering scale straps *q* and *r*, and the upper and lower knobs or pivots *e*, and *d*, substantially in the manner and for the purpose herein set forth.

2. I also claim the manner of taking the requisite measures for the formation of a coat, by my self registering instrument, and the combination therewith of a tape measure with a ring or loop at one of its ends substantially as herein set forth.

W. R. ACTON.

Witnesses:
Z. C. ROBBINS,
GUY C. HUMPHRIES.